United States Patent
Capozzi

(12) 
(10) Patent No.: US 7,810,941 B2
(45) Date of Patent: Oct. 12, 2010

(54) MULTI-LEVEL FLASH DIFFUSER

(76) Inventor: Michael J Capozzi, 3515 125th St., NW., Gig Harbor, WA (US) 98332

(*) Notice: Subject to any disclaimer, the term of this patent is extended or adjusted under 35 U.S.C. 154(b) by 346 days.

(21) Appl. No.: 11/764,132

(22) Filed: Jun. 15, 2007

(65) Prior Publication Data
US 2008/0310140 A1  Dec. 18, 2008

Related U.S. Application Data

(60) Provisional application No. 60/934,939, filed on May 16, 2007.

(51) Int. Cl.
G03B 15/02 (2006.01)
(52) U.S. Cl. .................. 362/17; 362/7; 362/9; 362/11; 362/15; 362/18
(58) Field of Classification Search ............. 362/3–18; 396/4, 60, 61, 155, 174, 190, 197, 198, 200
See application file for complete search history.

(56) References Cited

U.S. PATENT DOCUMENTS

| | | | |
|---|---|---|---|
| 2,235,864 A | 3/1941 | Brennan et al. | |
| 3,855,602 A | 12/1974 | Hoos | |
| 4,016,579 A * | 4/1977 | Lewis, Jr. .................. | 396/197 |
| 4,066,885 A | 1/1978 | Weinberg | |
| 4,084,168 A | 4/1978 | Pizzuti et al. | |
| 4,091,402 A | 5/1978 | Siegel | |
| 4,091,444 A | 5/1978 | Mori | |
| 4,146,918 A | 3/1979 | Tureck | |
| 4,251,854 A | 2/1981 | Kaneko | |
| 4,446,506 A | 5/1984 | Larson | |
| 4,479,173 A | 10/1984 | Rumpakis | |
| 4,633,374 A | 12/1986 | Waltz | |
| 4,757,425 A | 7/1988 | Waltz | |
| 4,845,641 A * | 7/1989 | Ninomiya et al. ........... | 345/632 |
| 4,991,063 A * | 2/1991 | Stoneham ..................... | 362/18 |
| 5,095,325 A | 3/1992 | Carstens | |
| 5,154,503 A | 10/1992 | Sternsher | |
| 5,311,409 A * | 5/1994 | King .......................... | 362/17 |
| 5,556,186 A | 9/1996 | Pilby | |
| 5,560,707 A | 10/1996 | Neer | |
| 5,839,006 A | 11/1998 | Beckerman | |

(Continued)

OTHER PUBLICATIONS

Internet: http://www/lumiquest.com/; LumiQuest The World Leader in Flash Accessories for Digital & Film; 2005 LumiQuest; 1 sheet.

(Continued)

*Primary Examiner*—Jong-Suk (James) Lee
*Assistant Examiner*—Mark Tsidulko
(74) *Attorney, Agent, or Firm*—Paul B. Heynssens, Attorney at Law, PLC

(57) ABSTRACT

The present example provides a flexible and compact system for diffusing light in multiple levels when taking photographs. An adapter capable of coupling many types of flashes is fitted to a first diffusion device. The diffusion device may be fitted inside a light box fitted with a diffusion lens so that additional light dispersion is provided. The light box may be substituted with a black box that tends to direct diffused light for further control over exposure. Various filters may also be used in the system allowing for further flexibility in setting exposure. And finally a system of reflectors and shields allow further control of lighting effects.

10 Claims, 13 Drawing Sheets

U.S. PATENT DOCUMENTS

| | | | |
|---|---|---|---|
| 6,234,638 B1* | 5/2001 | Beverly | 362/16 |
| 6,502,962 B1 | 1/2003 | Menke et al. | |
| 7,163,302 B2* | 1/2007 | Pohlert et al. | 362/11 |
| 7,510,290 B2* | 3/2009 | Pohlert et al. | 362/11 |
| 2006/0109640 A1 | 5/2006 | Fong | |
| 2006/0109641 A1 | 5/2006 | Fong | |
| 2008/0205031 A1* | 8/2008 | Chan-Wing | 362/17 |

OTHER PUBLICATIONS

Internet: http://www.stofen.com/; STO-FEN Products; 1 sheet.

* cited by examiner

MULTI-LEVEL FLASH DIFFUSER

CROSS-REFERENCE TO RELATED APPLICATION

This application claims the benefit of U.S. Provisional Patent Application No. 60/934,939 filed May 16, 2007, the contents of which are hereby incorporated by reference.

TECHNICAL FIELD

This description relates generally to photography, and more specifically to, flash photography.

BACKGROUND

Photography is a photonic technology. Since the invention of photography, technology to illuminate the subject being photographed has developed hand-in-hand with improvements in camera technology. Illumination of a subject being photographed, is typically needed to provide sufficient exposure so that the image may be recorded on film or on a digital media. Not only does light allow the technical implementation of photography, but it also allows artistic and creative effects to be achieved by the selective application of light, and varying the quality of light applied to a subject. For example, under or over exposure of a subject being photographed may be selectively used by a photographer to achieve a desired artistic or creative effect. Over and under exposure may be typically achieved by varying the amount of light on a subject. This may be accomplished by manipulating aperture and shutter speed of the camera being used, or by varying the amount of light on a subject.

In addition to manipulating exposure, the color of a photographic image may be varied according to the type of light applied to the subject being photographed. For example, incandescent bulbs tend to give a subject being photographed somewhat of a yellowish cast due to the color temperature of incandescent bulbs. Daylight typically gives a photographic subject a more natural appearance, without an undesired color cast. Various photographic light sources having a suitable color temperature, such as tungsten bulbs, may used to artificially illuminate a subject to provide a more natural color exposure. However, daylight and artificial lighting for more correct color exposure, can tend to give a subject a harsh appearance, which may be undesirable in some photographic applications, such as portrait photography. Harsh rendition, while it may be desirable in technical applications such as documenting technical details of the subject such as an architectural subject, or a machine part, may be undesirable in portraiture.

Harsh tones created by artificial light are typically credited to the directionality of light being applied to the subject. The rendition of the subject may be softened under artificial lighting conditions, typically by diffusing the light applied to the subject. Diffusing the light source may be realized by scattering the light, such as by redirecting it to the subject at various angles. This may be done by using a single light source and redirecting it through various devices, such as reflectors in the like. Or, softening may be done by inserting a diffusion device in front of the light source causing the light rays emanating from it to approach the subject from randomized angles, tending to cause harsh shadows created by direct lighting to be diffused, or softened.

For almost as long as photography has been in existence, technical problems in providing sufficient illumination of a subject have been present. Typically if the available light has been insufficient to illuminate a subject, attempts have been made to supply artificial light. Flash devices from flash powder, bulbs and strobe lights have been used to illuminate a subject. Modern flash devices tend to use reusable flash tubes or strobe devices. Such devices, although cost effective and efficient, tend to produce the harsh lighting effects typically undesirable in portrait photography.

To diffuse the light, a diffusing device may be used in conjunction with the flash device. In a studio setting, providing diffusion of light, can be a major effort expended in creating a pleasing photograph. Further difficulty arises when seeking to provide a diffused light source with a portable flash device. A challenge may exist in providing improved diffused lighting with a portable flash. Presently available diffusers for portable flashes including additional lighting effects may also be desirable. It may also be desirable to minimize the mechanical complexity of such devices and to provide an ergonomic, easily produced, design that allows for ease of use and operation while providing pleasing photographs.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present example provides a flexible and compact system for diffusing light in multiple levels when taking photographs. An adapter capable of coupling many types of flashes is fitted to a first diffusion device. The diffusion device may be fitted inside a light box fitted with a diffusion lens so that additional light dispersion is provided. The light box may be substituted with a black box that tends to direct diffused light for further control over exposure. Various filters may also be used in the system allowing for further flexibility in setting exposure. And finally, a system of reflectors and shields allow further control of lighting effects.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

The examples below describe a photographic light diffusion system. Although the present examples are described and illustrated herein as being implemented in a portable camera system, the system described is provided as an example and not a limitation. As those skilled in the art will appreciate, the present examples are suitable for application in a variety of different types of photographic systems.

The light box system, or assembly, may include a light box black box, a small base diffuser assembly, (including an integral adapter), an internal reflector, an external reflector, a sensor shield, a diffusion lens, a set of colored filters, and a set of diffusion filters. The design is modular and allows a small base diffuser assembly to be used with the larger light box. The small based diffuser that may sit inside the larger light box and can provide multiple levels of diffused light from the flash. The small based diffuser includes an adapter that allows multiple types of flashes to be securely coupled to either the black box or the light box. By being able to couple, or snap in the small based diffuser into the light box, shims or spacers are not needed, allowing a secure coupling between the flash and the light box with fewer pieces. Coupling the flash to the adapter may be by a friction retained slide on mounting or friction fit. The mounting used provides a greater frictional contact area of approximately 1¼ inches with the flash body. This provides an improved friction fit over what may be available causing the small based diffuser assembly and the light box to remain securely in place on the flash.

The light box system may be constructed from any convenient material suitable for the application. An example of a suitable material is a co-polymer polypropylene plastic vinyl or its equivalent. Suitable materials are typically suitable for injection molding, have neutral color, are semi-flexible (but not too rigid), exhibit durability, and do not tend to be photo sensitive. Flexibility may be provided to a degree that allows the various tabs and snap together feature of the example described below to be implemented. However, if flexibility of materials is not provided, other fastening methods may be equivalently provided.

Figure 1:
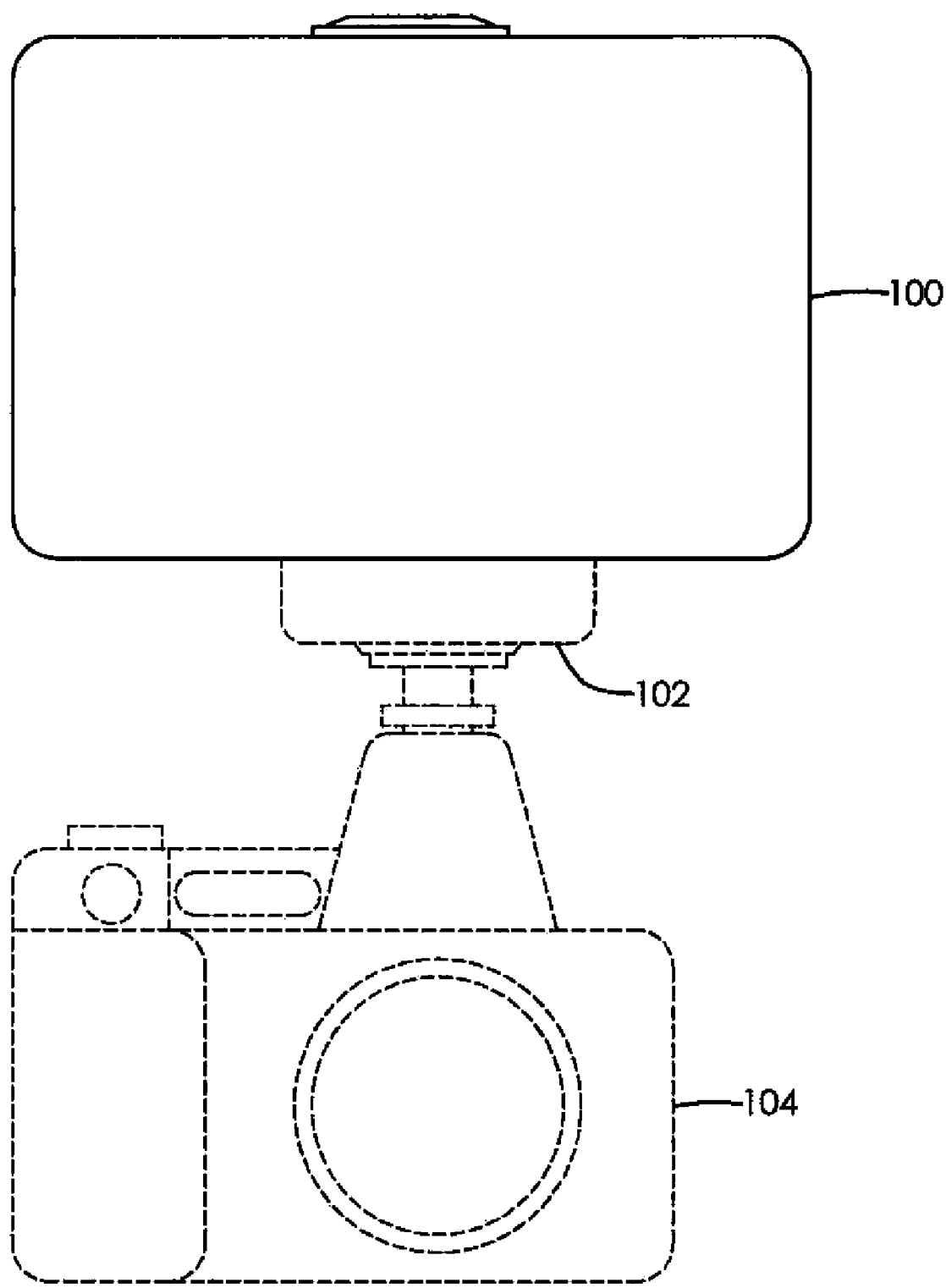
FIG. 1 shows a light box assembly coupled to a flash which is in turn coupled to the body of a camera.

FIG. 1 shows a light box assembly 100 coupled to a flash 102 which is in turn coupled to the body of a camera 103. The light box 100 is an assembly that provides for the flexible user configured diffusion and projection of light from the flash 102 onto a subject (not shown) being photographed. Narrow components may be added or removed as desired by the user to achieve a desired flash effect. The light box 100 may be pointed directly at the subject as shown, or may be directed away from the subject, such as in a bounce flash situation. The light box assembly may be configured by selective use of various components of the light box assembly to control illumination of a subject being photographed as desired.

The flash unit 102 is a conventionally constructed flash and may be mounted by a conventional hot shoe attachment, or by equivalent coupling method to a camera 103. The flash may, or may not, tilt for use as a balance flash. The flash 102 may be as shown, or equivalently may be constructed as a conventional side mount unit. A side mount unit typically includes a cylindrical handle with a flash bulb or tube at one end of the handle and a mounting bracket at the other end of the handle. The side mounted flash couples to the camera by conventional mounting bracket. A flash sensor may be provided with the flash unit. The flash unit may be coupled to a hot shoe, may be part of the flash body, or may be placed in any suitable location. The flash housing for the lens and flash tube or bulb may be provided in any suitable shape. The light box assembly 100 may couple to a large variety of differently shaped lenses and flash housings.

The camera 103 shown, may be a single lens reflex camera or its equivalent. Cameras are typically available in a digital or film format and are suitable for use with the light box. Equivalently, other types of cameras such as range finder and the like, capable of being equipped with a flash 102 may also be used with a light box assembly 100.

Figure 2:
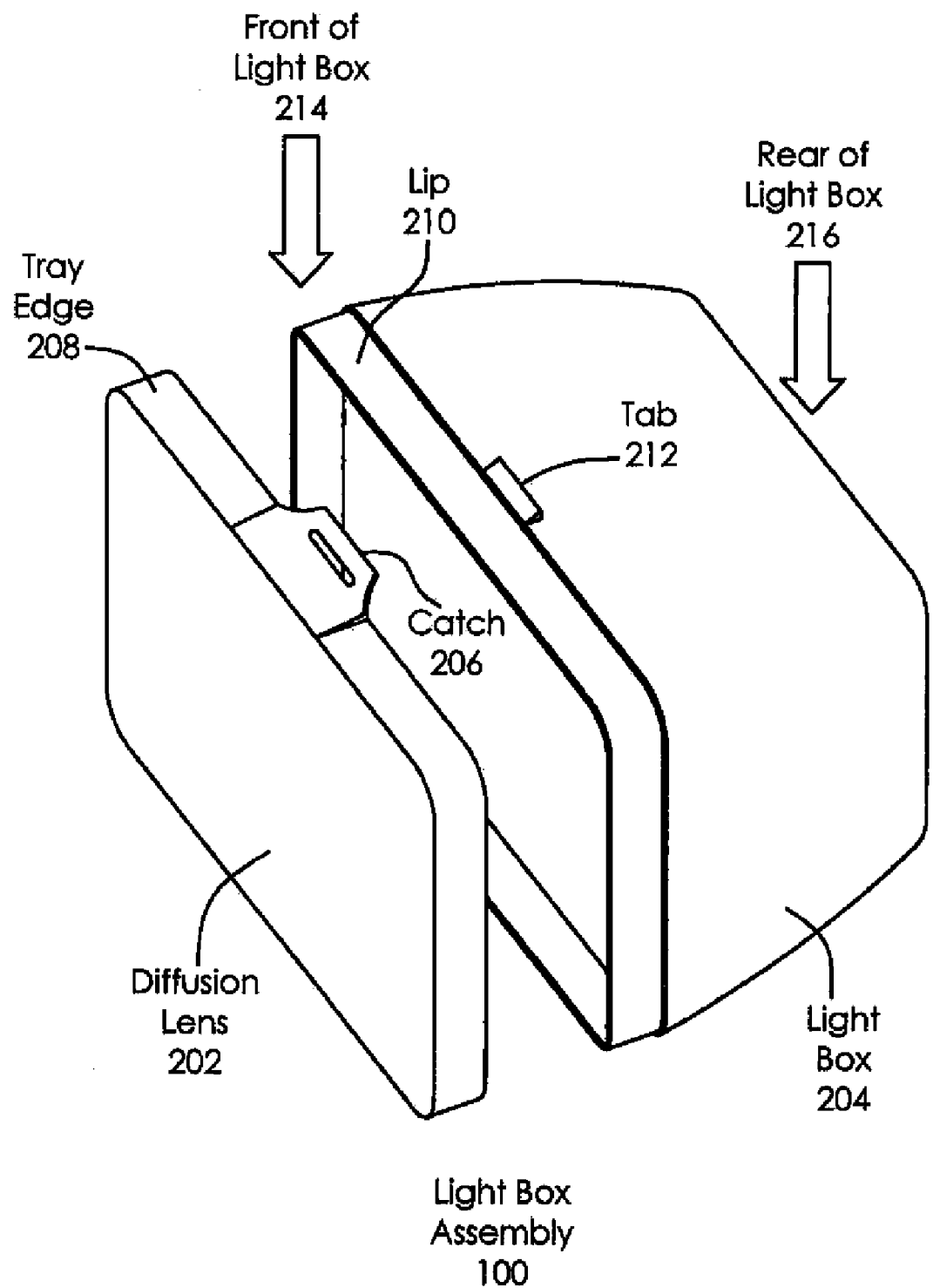
FIG. 2 shows the diffusion (or light box lens) lens and the light box 204 that may be part of the light box assembly.

FIG. 2 shows the diffusion (or light box lens) lens 202 and the light box 204 that may be part of the light box assembly 100. The diffusion lens 202 is typically made from partially opaque or frosted material so that light shining from a flash unit inside the light box is diffused by the diffusion lens 202 and light box 204. Light typically shines from the flash unit inside the light box assembly and is first diffused by a small based diffuser assembly (not shown) that may be present inside the light box. The small based diffuser assembly is typically covered by the light box, and light box lens when in use. Thus, light may be diffused a second time through the light box 204, and the diffuser lens 202 before reaching in the subject.

The diffusion lens 202 is typically rectangular and tray shaped having upturned edges. However, other equivalent shapes such as round, oval, or the like may be provided for diffusion lenses. The top, or front, 214 of the light box may include thinned material formed into a lip 210 around the periphery with a pair of mating tabs such as 206, 212 (take on opposite sides not shown) for receiving and retaining the diffusion lens. The sides of the light box may also include grooves or indentations for accepting Velcro fasteners to couple other components to the light box assembly. The light box typically diffuses light in substantially all direction about the tops, sides, bottom and front of the light box assembly. However, much of the light tends to emanate from the front of the light box 214. As shown, the edges of the tray 208 may be received by a corresponding lip 210 on the light box. To further secure the lens a pairs of tabs 212, (opposite side catch not shown) on the light box lens that are snapped over mating flaps or catches 206 (opposite side catch not shown) provided on the light box 204. Other equivalent ways of attaching the diffusion lens 202 to the light box 204 other than the tabs 212 and flap 206 arrangement may be provided. For example, Velcro, snaps and the like may be used. The light box 204 is typically made from the material suitable for diffusing light previously described. The overall shape of the light box assembly 100 is typically box shaped and formed such that the light box 204 is removed easily from an injection mold when it is fabricated. The sides of the box are typically frosted to aid in diffusion of light from the small based diffuser disposed in the bottom of the light box 204. In alternative examples, the grooves around the edge of the light box for receiving the diffusion lens 202 may be omitted. However, the example configuration described tends to make a slimmer, more stream-lined appearance when the diffusion lens 202 is coupled to the light box 204. In coupling the diffusion lens 202 to the light box 204, a fit is produced such that light from the flash unit is not directly seen, and uniform diffused light can be generated by the multiple levels of diffusion that may be provided.

Figure 3:
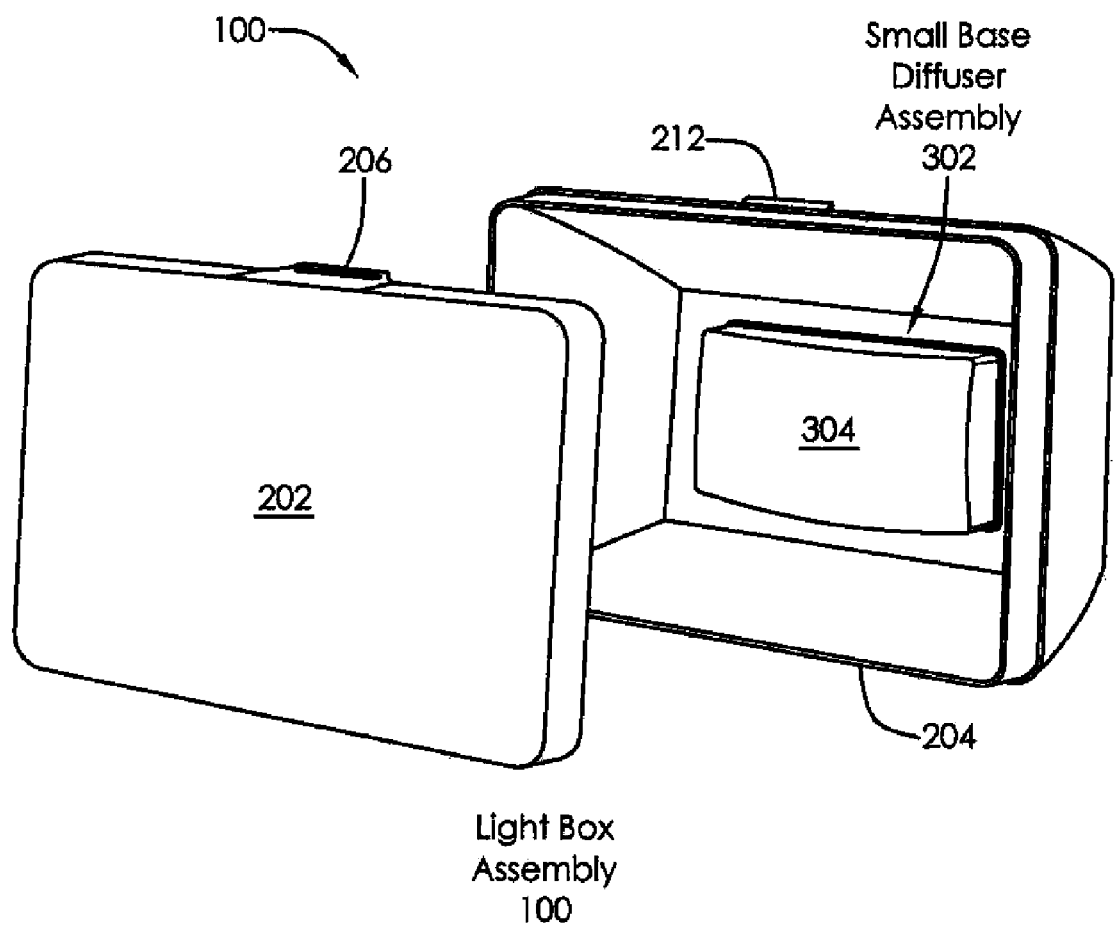
FIG. 3 is a diagram showing an exploded view of the light box assembly exposing the small based diffuser assembly installed in the light box with the small based diffuser dome 304 showing.

FIG. 3 is a diagram showing an exploded view of the light box assembly 100 exposing the small based diffuser assembly 302 installed in the light box 204 with the small based diffuser dome 304 showing. The light box may include a bottom or rear surface (216 of FIG. 2) which may include an opening for receiving the small based diffuser assembly 302 which can, typically be installed through an interference fit, or its equivalent. The small based diffuser lens (or dome) 304 can provide a first level of diffusion, and the diffusion lens 202, and light box 204, when assembled, provides a second level of diffusion. However, either the dome or lens may be removed as desired to use to achieve desired effect.

Figure 4:
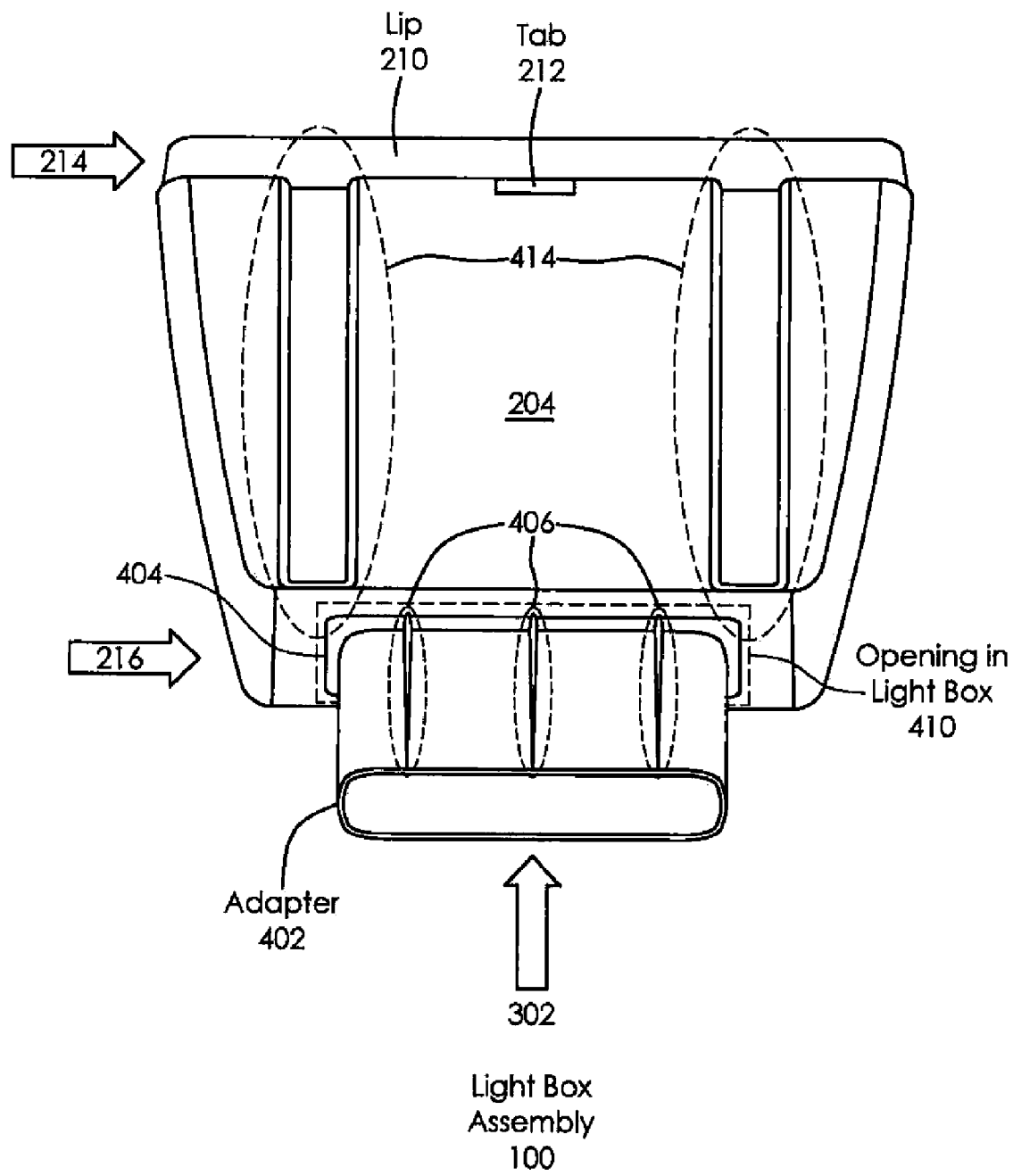
FIG. 4 shows a rear view of a light box in which the small based diffuser assembly has been installed showing the adapter of the small based diffuser assembly.

FIG. 4 shows a rear view of a light box 204 in which the small based diffuser assembly 302 has been installed showing the adapter of the small based diffuser assembly. Coupling it typically through an interference fit or its equivalent. As shown, the light box 204 includes an opening disposed at its rear 410. The adapter portion 402 of the small based diffuser assembly 302 includes a light box filler or plug formed to match the opening 410 in the light box 204. In assembling the small based diffuser assembly 302 into the light box 204, the small based diffuser assembly 302 may be dropped into the opening 410 disposed in the light box through the big opening at the front end of the light box 214. A ledge formed above the plug and (not shown) disposed at the periphery of the adapter 402 at opposite ends prevents the small based diffuser assembly 302 from dropping through the light box 204, and also positions the plug to fill the opening. A plurality of interference tabs 406 are disposed on the sides of the small based diffuser adapter 302 to hold the small base diffuser assembly in place in the light box 204 when the adapter is positioned so that the plug fills the opening 410. In the example shown, the plurality of tabs 506 are disposed on a first side of the adapter, as shown, and on a second side of the adapter (not shown). Equivalently, other methods of securing the small based diffuser assembly may be provided.

The small based diffuser assembly 302 includes a diffuser lens (hidden in this view) coupled to an adapter 402. The small base diffuser lens, couples to the adapter 402 by a press fitting coupling or its equivalent. The diffuser lens may simply snap over a surface provided on the adapter so that a unitized assembly may be provided that may be easily assembled. Multiple different adapters may be produced to accommodate the various types of flash units that may be in a photographer's camera bag. The small based diffuser assembly then slips into an opening 410 for the light box 204 where it couples to the light box 204 in a somewhat rigid, but easily removable manner by the previously explained plurality of tabs and ledges.

Figure 5:
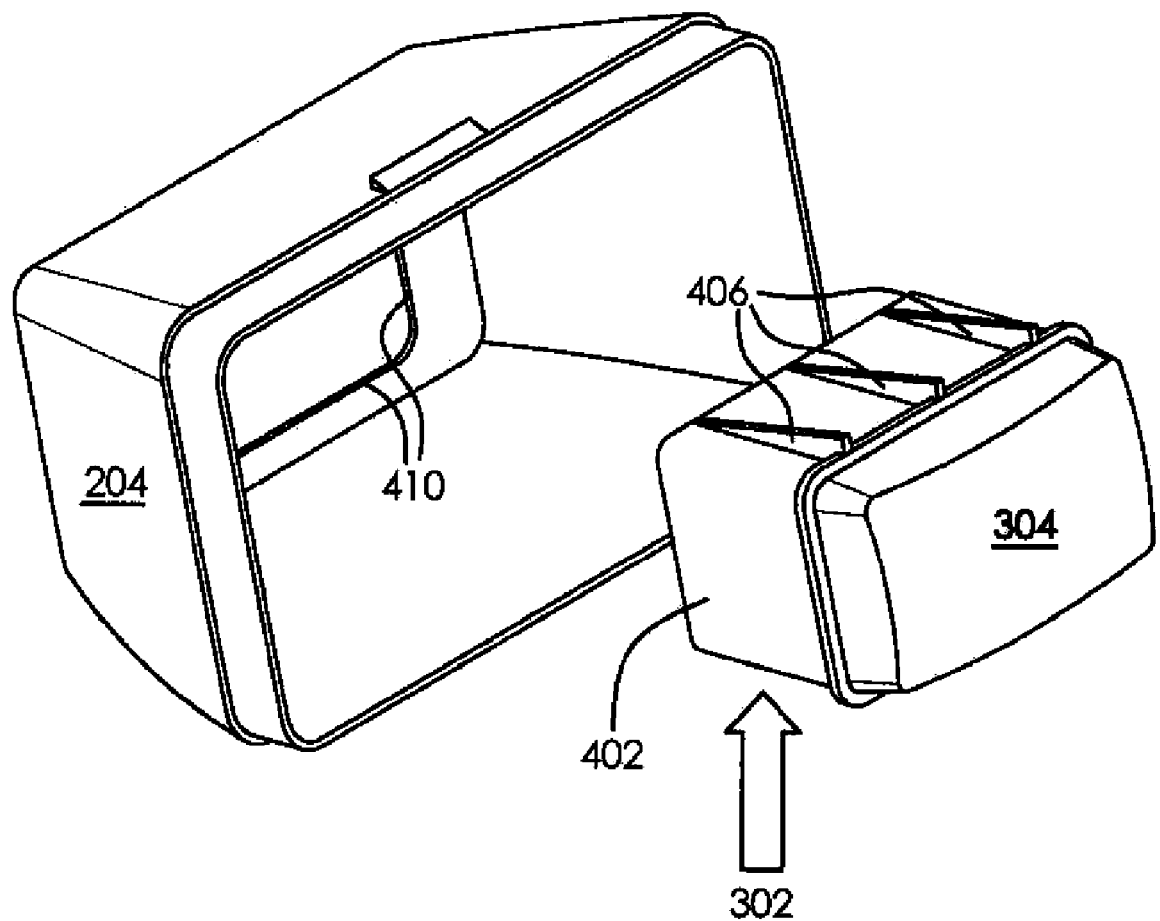
FIG. 5 shows the small-based diffuser assembly prior to installation into the light box.

FIG. 5 shows the small-based diffuser assembly prior to installation into the light box. The small based diffuser lens or dome 304 may be dome shaped, or of any suitable shape and provides a first diffusion which may be in addition to any secondary diffusion that may be provided by the light box 204 and light box lens (not shown). In use, a photographer may rely on the diffuser lens and the sides of the light box to provide diffusion of light from the flash without the light box lens (202 of FIG. 2). The light box lens, may be attached or coupled to the light box 204 so that when light from the flash first passes through, the diffuser lens 304, it will also pass through the light box lens and sides of the light box providing an additional second level of diffused light. The second level of diffused light, allows a photographer to further manipulate the lighting environment provided to a subject being photographed.

The light box 204 also provides diffusion of light for illuminating the subject when used on its own. It is also worthwhile mentioning, that further manipulation of subject lighting may be provided by removing the diffuser lens to simply provide a single level of diffusion through the light box and diffusion lens.

The small based diffuser assembly 302 may include a diffuser dome 304 (or small based diffuser) and a bottom flash adapter 402. The adapter 402 and the small based flash diffuser 304, are typically coupled by an interference fit at the peripheral edges where they meet. The diffuser 304 may be shaped to spread the light from the flash efficiently. The small based diffuser 304 may be fabricated in a single size and the adapter 402 may be supplied in differing configurations to accommodate different flashes. The small based diffuser adapter 402 is typically an injection molded part formed such that is slides easily from its mold, as such, it may be fabricated efficiently. The adapter is typically injection molded from an opaque plastic material and includes 3 tabs on each side. The side tabs allow an interference fit between the small based diffuser assembly 302 and either a light box or black box that locks the small based diffuser to the light box. For example, the small based diffuser drops into either the black box or the light box and the black plastic portion is pushed through the opening until the 3 tabs on either side push past the opening as the diffuser base is deformed inward either by pushing it or by squeezing the sides. Once the edge of the tab has been passed, the small based diffuser becomes firmly coupled to the light box or black box. The small based diffuser assembly, and thus the light box assembly, may be made to accommodate a variety of flashes by simply changing the size of the diffuser base. The light box securely attaches and locks to small the based diffuser because of the interference fit with the 3 tabs. Adapters may be changed as needed to accommodate different flashes. In an alternative example, the interference tabs may be disposed on the ends of the adapter with the ledge on the sides.

Figure 6:
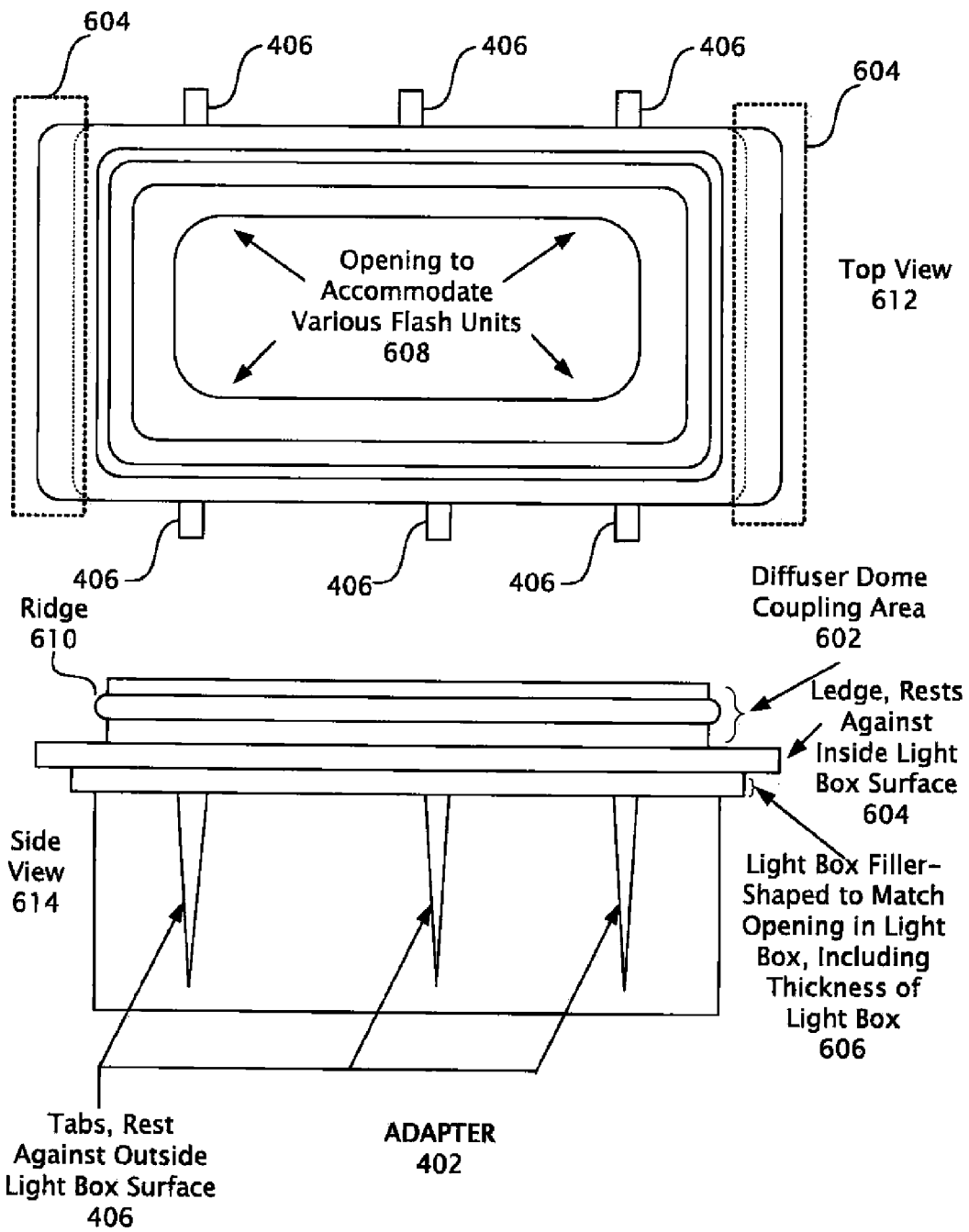
FIG. 6 shows details of the construction of the adapter from the small base diffuser assembly.

FIG. 6 shows details of the construction of the adapter 402 from the small base diffuser assembly. A top view 612, and a side view 614 of the adapter is shown. In the top view, an opening in the adapter that allows light to be emitted from various flash units 608 is shown. The opening widens to form a sleeve in the body of the adapter that slips over the flash unit and tends to stay in place by a friction fit. Light from the flash unit travels through the opening 608 and subsequently through a small based diffuser coupled to the adapter.

Also shown in the top view 612, are tabs 406 disposed at intervals along the side of the adapter. A total of six tabs are shown, however, other tabbed arrangements and numbers may be provided in equivalent configurations. The tabs 406 tends to act to hold the adapter in place from the outside of the light box. The adapter is held in place on the interior of the light box by ledges 604 formed at each end of the adapter as shown. The ledges tend to prevent the adapter from falling through a hole in the light box in one direction, and the tab 406 prevent the adapter from falling through the light box in the opposite direction. The material the adapter is formed from is typically flexible enough so that when the sides of the adapter are squeezed, the tabs clear the sides of the hole in the light box causing the adapter to be mounted securely in the light box as it is held in the ledges 604 on one side and the tabs 406 on the other side. When released, the material tends to spring back.

Side view 614 shows the diffuser dome coupling area 602, the ledge 604, a light box filler area 606 and the tabs 406. The diffuser dome coupling area 602, provides a way to attach a universal diffuser dome (304 of FIG. 3) to the adapter. The diffuser dome typically includes a matching or mating groove disposed about its interior periphery that mates to the ridge 610 disposed on the adapter 402. The diffuser dome tends to snap into place and may be removed by pulling it off. The ledges 604 are provided at the ends of the adapter and are of sufficient size to prevent the adapter from falling through the light box when it is installed. The ledge rests against the inside of the light box surface allowing a filler area 606 disposed beneath the diffuser dome coupling area to fill the opening in the light box. To prevent the adapter from falling out from in front of the light box, the tabs 406 are provided below the filler shape. Thus, the filler 606 is held snuggly in the light box opening by tabs 406 on one side and the ledge 604 on the other.

Figure 7:
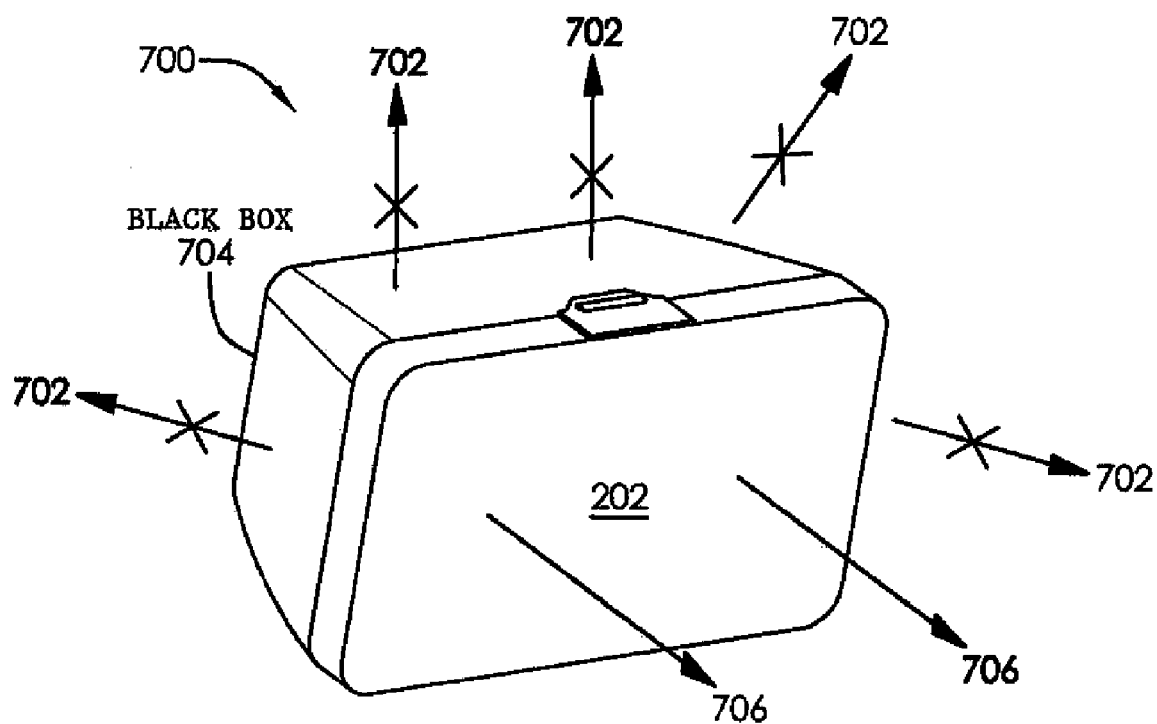
FIG. 7 shows a view of a black box assembly

FIG. 7 shows a view of a black box assembly 700. A black box may be used to limit the light emanating from the sides of the flash, while still providing diffusion in front of the flash. The black box 704 is constructed substantially similar to the previously described light box, however, the material of the black box is built of tends to be opaque so that the light from the flash shining through the small based diffuser shines only from the front 706 of the black box and not the sides or top and bottom surfaces 702. The black box assembly 700 may be used in substantially the same way as a light box, and is constructed similarly.

Figure 8:
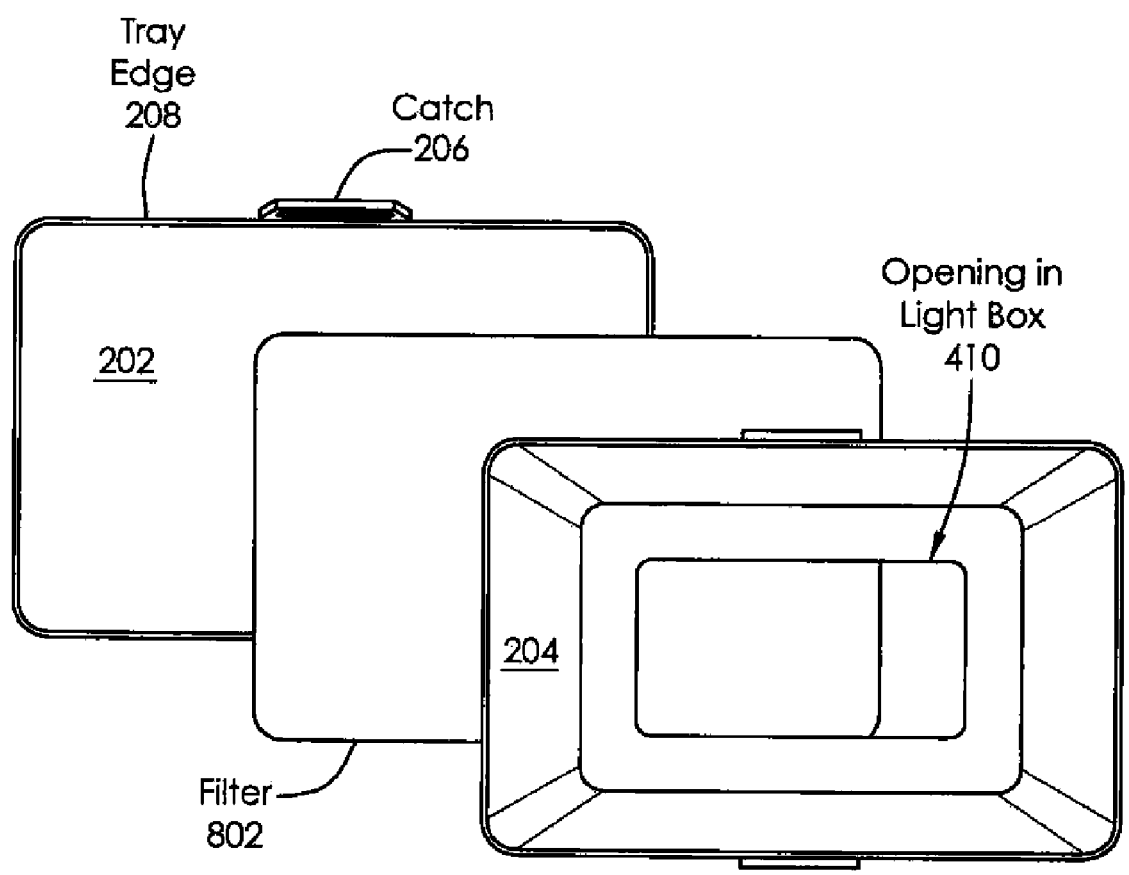
FIG. 8 shows an exploded view of a filter 802 as it may be installed in the light box assembly.

FIG. 8 shows an exploded view of a filter 802 as it may be installed in the light box assembly 100 Filters 802 may be cut to the shape to the diffusion lens 202 and dropped into place into the diffusion lens 202 and then the diffusion lens is typically snapped onto either the light box 204 or the black box. The filter 802 easily stays in place up against the diffusion lens 202 by the grip of the light box or black box holding the filter against the diffusion lens. As shown, the filter 802 is disposed against the inside surface of the diffusion lens 202. The filter 802 is cut large enough so that it typically touches the edges of the tray 208 formed by the diffusion lens periphery. When the diffusion lens 202 and filter 802 are snapped in place onto the light box 204, an edge in front of the light box, sandwiches the filter between the light box edge and the front surface of the diffusion lens 202. This typically provides a secure way of mounting the filter 802 onto the light box.

Alternatively, other equivalent methods of securing the filter to the diffusion lens may be provided. For example, a clip may be provided on the diffusion lens, Velcro fasteners could be provided, tabs on the light box may be provided to hold the filter at the front of the light box, or other equivalent ways of fastening filter in front of the diffusion lens may be provided. In a further alternative example, the filter may be disposed on the outside of the diffusion lens and held in place by any suitable method. In a further example of mounting a filter between the diffusion lens and the light box, a lip may be added at the edge of the light box to provide a larger gripping surface to hold the filter against the diffusion lens. Alternatively, a non-stick material, such as silicon rubber may be added to the edge of the light box to provide an additional gripping surface to hold the filter against the diffusion lens. In yet a further alternative example, colored diffusion lenses may be provided as well as diffusion lenses having different densities.

Figure 9:
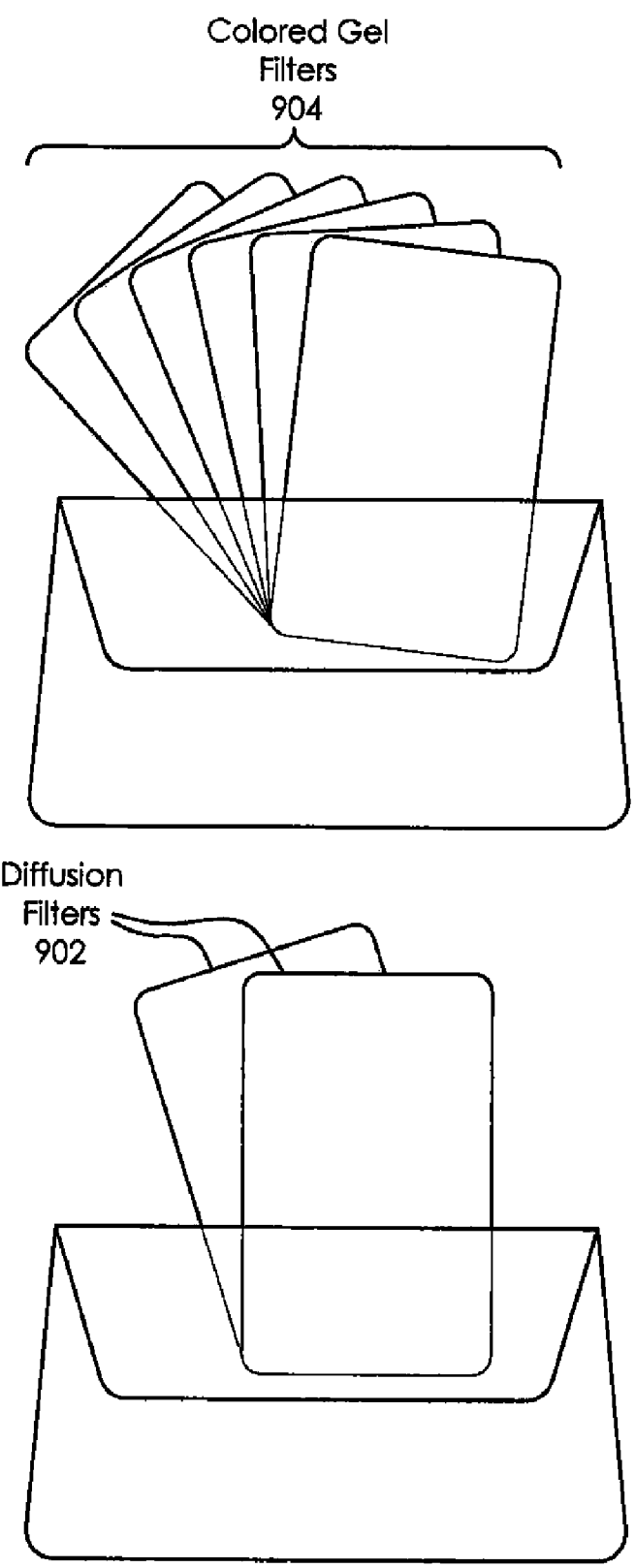
FIG. 9 shows a typical diffusion and colored gel filter packages.

FIG. 9 shows a typical diffusion 902 and colored gel 904 filter packages. The diffusion filters 902 are typically available in multiple grades to produce various diffusion effects. Diffusion filters 902 may be paper or any suitable material for providing the desired degree of diffusion. A variety of colored filters, or gel filters 904, (such as Lee filters), may also be provided. Lee filters, for example, are typically available in over 200 colors to produce the desired lighting effect. Alternatively, other types of filters in other colors and diffusion grades may be provided. Alternatively, colored diffusion lenses or diffusion lenses made to have a specific density may be provided instead of filters.

Figure 10:
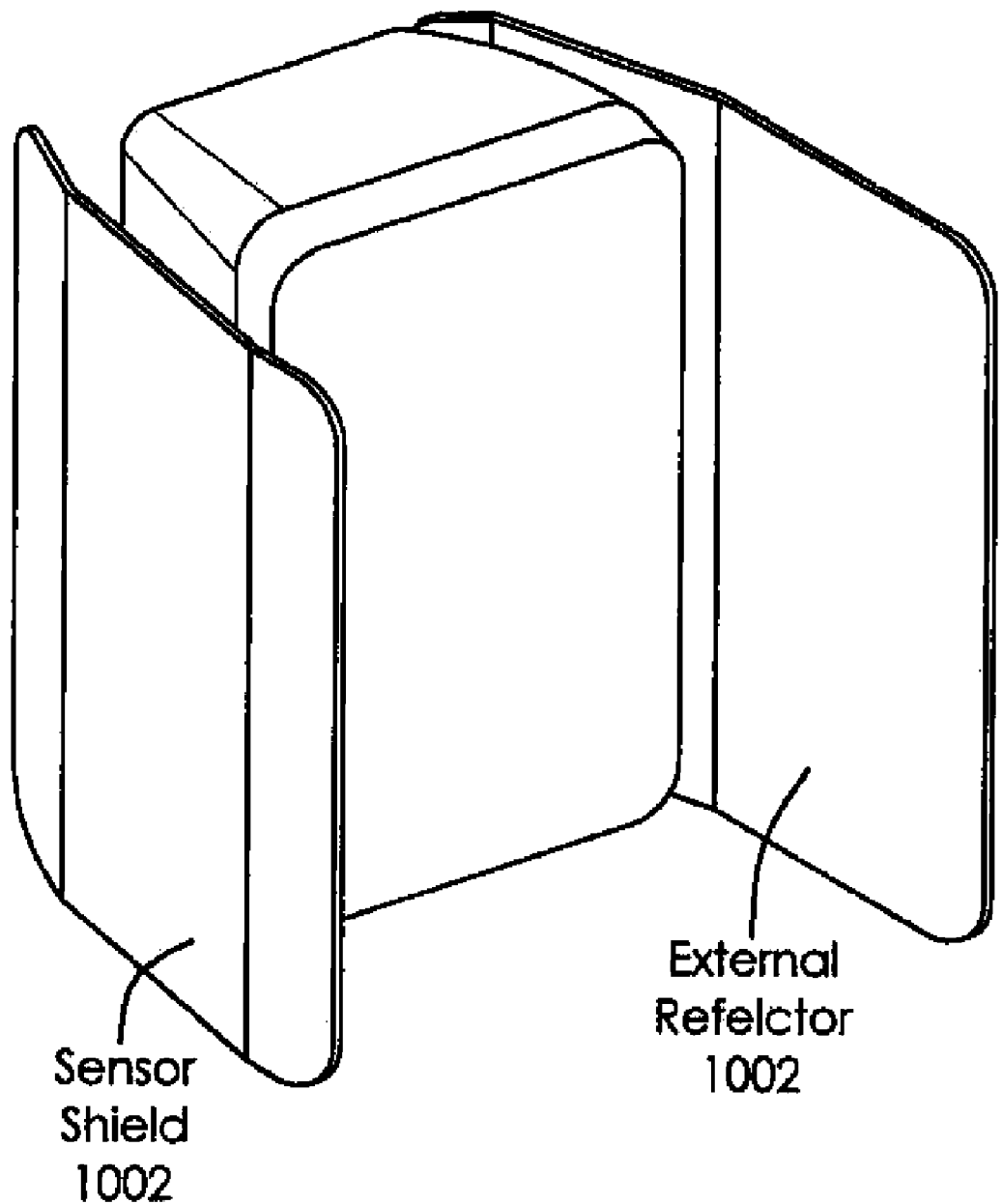
FIG. 10 shows an external reflector and a sensor shield installed as part of the light box assembly.

FIG. 10 shows an external reflector 1002 and a sensor shield (or alternatively a lens shield) 1004 installed as part of the light box assembly. The reflector and shield 1002, 1004 may be used separately or in combination as desired. Panels such as external reflectors 1002 and sensor shields 1004 may be coupled to light box by various attachment methods such as Velcro fasteners and the like. When using Velcro fasteners, either the hooks or the loops may be disposed on the light box with the opposing fastener being disposed in a corresponding position on the desired panel. To aid positioning the fasteners, and providing a more rigid surface, grooves (414 of FIG. 4) may be disposed in the light box assembly to hold the Velcro fastener and effectively reduce their height. Grooves provided in the light box assembly, allow for the height of the fasteners to be reduced so that the panel will rest close to the body of the light box providing a more rigid and stable mounting surface so that the attached panel tends not to move.

The external panels 1002 may be used to control the illumination of the subject and to control the effects of the flash on exposure. Panels may act to block or direct light for exposure of a subject. Effects on exposure may include stray light causing reflections or flare on the camera lens, or causing adverse effects upon the camera metering, as light is often measured through the camera lens. Thus, it may be advantageous to provide panels or shields to control the flow of light from the light box such that more control of the flash and exposure is provided.

A sensor and/or lens shield 1002 would typically be mounted on the light box such that it falls between the light box and a sensor on the camera body or the flash. A sensor or lens shield may also be positioned to shield the lens. A reflector is typically provided so that light emanating from the top of the light box may be directed down or out towards the subject or even blocked. Alternatively, additional panels may be provided upon the sides of the light box to provide additional lighting control. Also, the size of the panel as shown, are substantially equal to the width of the light box, however, the panels may be trimmed or sized as desired in order to make them more compact and efficient in doing their job as a given situation may call for. As shown, the light box assembly with the panels includes the diffusion lens, however, in use, the diffusion lens may be removed while using the reflector or sensor shield if desired.

Figure 11:
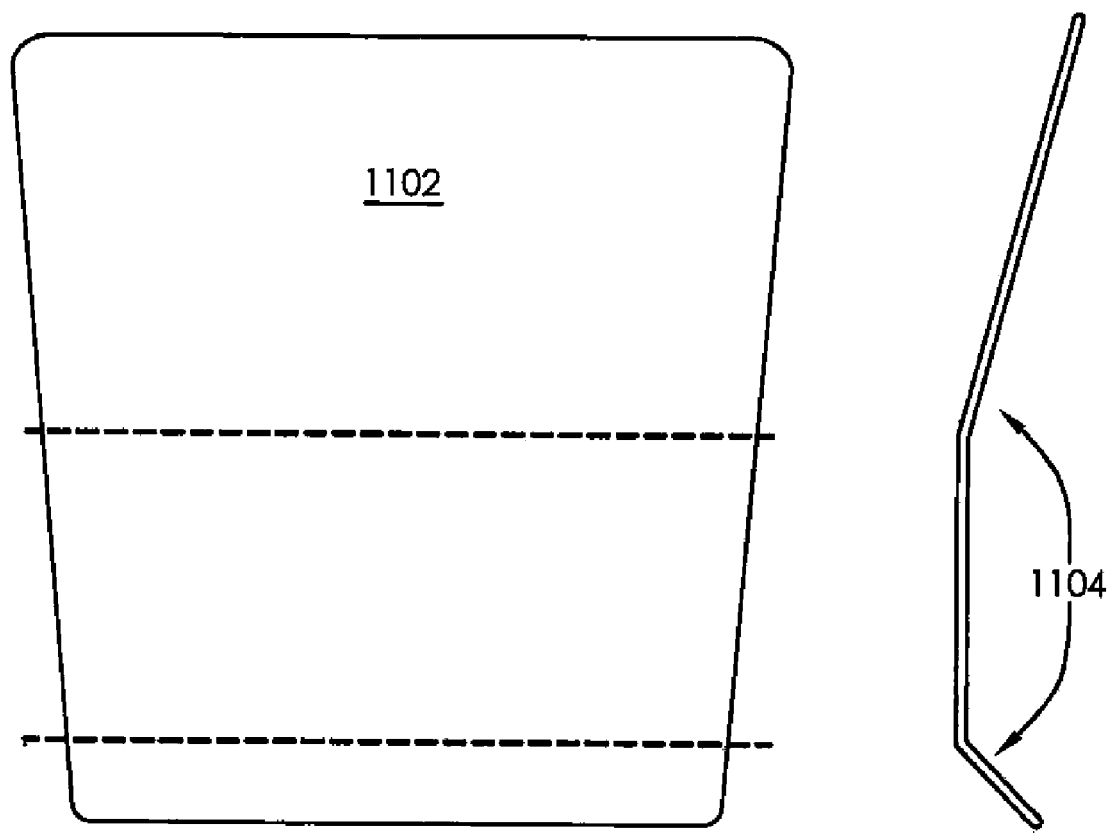
FIG. 11 shows an exemplary external reflector or sensor shield, both are similarly formed.

FIG. 11 shows an exemplary external reflector or sensor shield 1102, both are similarly formed. External reflectors typically formed from opaque plastic reflective material or their equivalent. In alternative examples, reflective or textured surfaces may be provided. The overall shape of the external reflector is typically trapezoidal with the base being narrower than the top. The external reflector also includes breaks 1104 so that it fits closer to the body of either of the light box or the black box upon which it is typically coupled. In alternative examples of an external reflector, the external reflector may be formed in more of a hood shape to reflect some of the light from the sides as well as the top of the light box or black box. In a further alternative example, multiple external reflectors may be used on the sides of the light box in order to reflect light in a more directed manner.

The sensor shield typically fits between the lens and flash. The sensor shield provides shielding of the camera sensor tending to prevent erroneous readings and also tends to shield the lens from flair effects that may be produced by a flash. The sensor shield is typically made from opaque plastic material or its equivalent and as shown, may also be trapezoidal shaped with a base narrower than its top.

The sensor shield also includes break lines in order to make the sensor shield fit closer to either the light box or the black box. The sensor shield couples to either the black box or the light box through Velcro strips or their equivalent which may include one strip disposed on the sensor shield with its mating strip disposed on either the black box or the light box. Alternatively, the sensor shield may be supplied in other configurations to shield the sensor of specific camera models.

Figure 12:
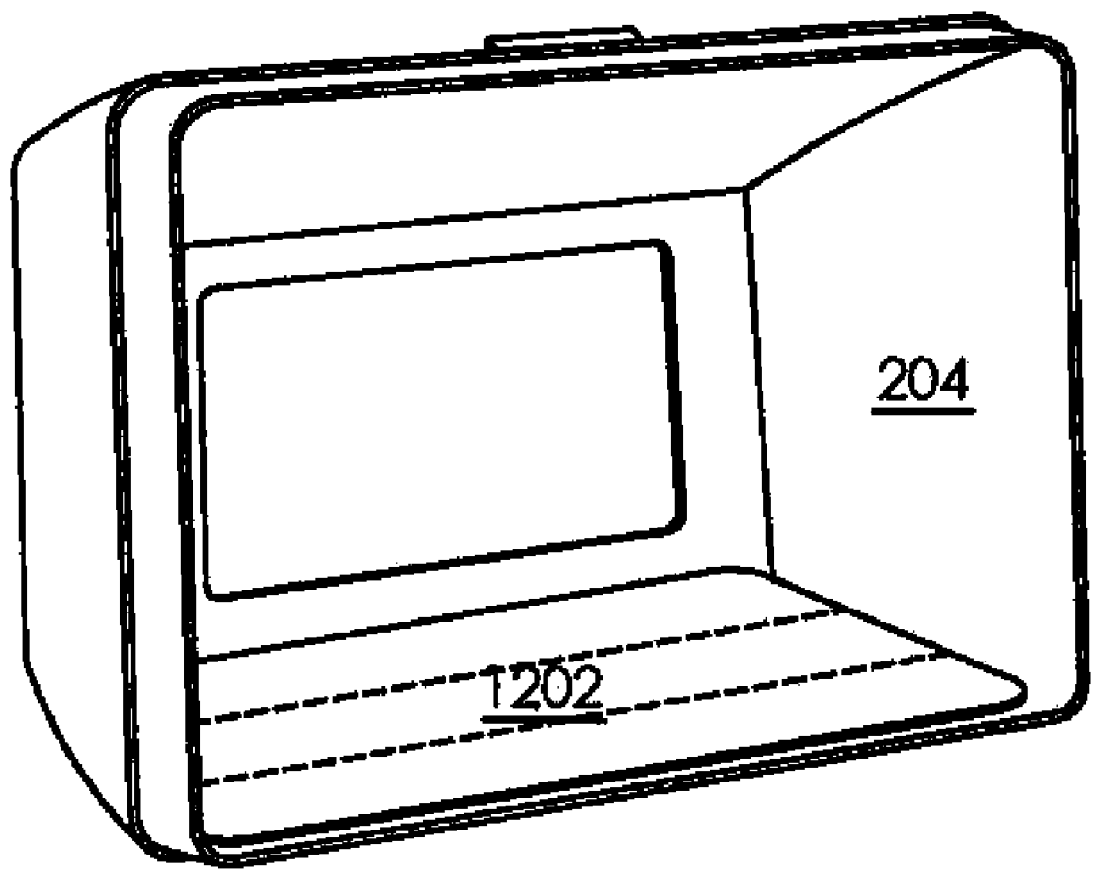
FIG. 12 shows an internal, or mini, reflector installed inside a light box assembly with the diffusion lens removed.

FIG. 12 shows an internal, or mini, reflector installed inside a light box assembly with the diffusion lens removed. A smaller reflector may also be installed inside of the light box to make the light box assembly more compact. The smaller reflector tends to prevent diffusion from the surface upon which it is placed against. The mini reflector may be coupled to the light box by a Velcro or other equivalent fastening methods. Velcro allows for ease of installation and removal and also may allow for positioning the reflector with some variation within the light box.

The internal reflector is typically formed from a sheet of plastic as previously described in FIG. 11. It may be cut to shape to fit inside the light box as previously shown. Breaks may also be included to provide a better fit inside the light box. The internal reflector is typically made from a plastic material that is opaque and somewhat reflective.

The internal reflector may also be equipped with a strip of Velcro so that it may be attached to a mating Velcro surface disposed on the inside of the light box or the black box. Alternatively, other equivalent methods of fastening the internal reflector to the inside of the light box or black box may be provided. In further alternative examples, the internal reflector may be made from a textured material or may also be made such that only a partial surface of the light box is covered by the internal reflector. In further alternative examples, additional internal reflectors may be supplied for either the sides of the box or the opposite wall as well so that the user may change the configuration as desired.

Figure 13:
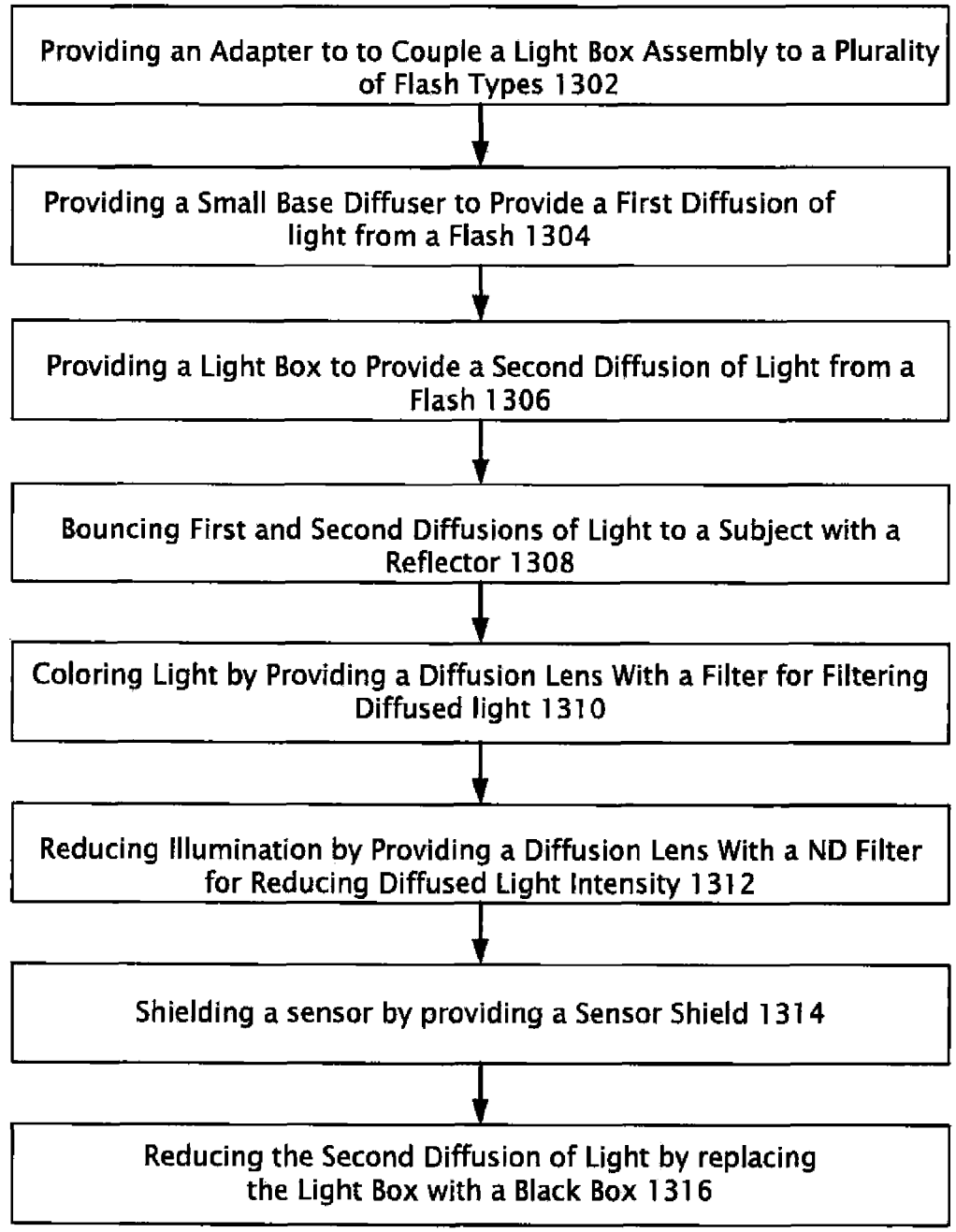
FIG. 13 shows a flow chart describing a process for illuminating a subject with diffused light provided by a light box assembly.

FIG. 13 shows a flow chart describing a process for illuminating a subject with diffused light provided by a light box assembly. First, an adapter is provided to couple a light box assembly to a plurality of flash types 1302. Coupling is typically provided by selecting an adapter corresponding to a given make and model of flash. Next, a small based diffuser is provided by coupling it to the adapter. The small based diffuser produces a first diffusion of light from the flash 1304. Next, the light emanating from small based diffuser is again diffused by the light box. The light box tends to provide second diffusion of the light from the flash 1306. Next, light that has been subject to first and second diffusion, may be bounced to a subject with a reflector 1308. Alternatively, light having only one level of diffusion either from the small based diffuser or from the light box lens or diffusion lens may be provided to the reflector. Coloring of the light may also be provided by fitting the diffusion lens with a filter for filtering diffused light 1310 and, illumination may be reduced to provide a third diffusion of light by providing the diffusion lens with a diffusion filter for reducing diffused light intensity 1312. And, the sensor may be shielded by providing a sensor shield 1314. Finally, the direction of the second diffusion of light may be further controlled by replacing the light box with a black box 1316.

Those skilled in the art will realize that the process sequences described above may be equivalently performed in any order to achieve a desired result. Also, sub-processes may typically be omitted as desired without taking away from the overall functionality of the processes described above.

The invention claimed is:

1. A photographic flash diffuser system for coupling to a photographic flash comprising:
    a light box made from a material to diffuse light through the light box and having an aperture coupled to an adapter by a plurality of tabs disposed on the adapter engaging an aperture edge of the light box;
    a small base domed diffuser assembly with a small based diffuser fixedly coupled to the adapter and enclosing a light emanating from the photographic flash, and coupled to the photographic flash diffuser system by a friction fit with the adapter;
    a diffusion lens coupled to the light box; and
    a filter disposed in the diffusion lens, in which the filter is a diffusion filter, and in which light from a photographic flash is first diffused by a small base diffuser of the small base diffuser assembly, and then by the diffusion filter and diffusion lens combination, and the light box which together form a second diffusing surface.

2. The photographic flash diffuser system of claim 1 in which light from a photographic flash is first diffused by a small base diffuser of the small base diffuser assembly, and then by the light box and the diffusion lens.

3. The photographic flash diffuser system of claim 1 in which the adapter is press fit into an opening disposed in the light box.

4. The photographic flash diffuser system of claim 1 further comprising a shield coupled to the light box.

5. The photographic flash diffuser system of claim 1 further comprising an external reflector coupled to the light box.

6. The photographic flash diffuser system of claim 1 further comprising an internal reflector coupled to the light box.

7. An apparatus for diffusing light comprising:
    a small base diffuser assembly including an adapter coupled to a photographic flash by a friction fit, and a small based diffuser fixedly coupled to the adapter so that light from the photographic flash is first diffused through the small based diffuser;
    a light box for diffusing light emanating from the small based diffuser that is coupled to the small base diffuser assembly by engaging tabs disposed on the adapter;
    a diffusion lens coupled to the light box for diffusing light emanating from the small based diffuser not diffused by the light box; and
    a filter disposed in the diffusion lens, in which the filter is a diffusion filter, and in which light from a photographic flash is first diffused by a small base diffuser of the small base diffuser assembly, and then by the diffusion filter and diffusion lens combination, and the light box which together form a second diffusing surface.

8. The apparatus for diffusing light of claim 7 in which a black box is substituted for the light box.

9. The apparatus for diffusing light of claim 7 further comprising a reflector detachably coupled to the light box.

10. The apparatus for diffusing light of claim 7 further comprising a sensor shield detachably coupled to the light box.

* * * * *